Figure 1:
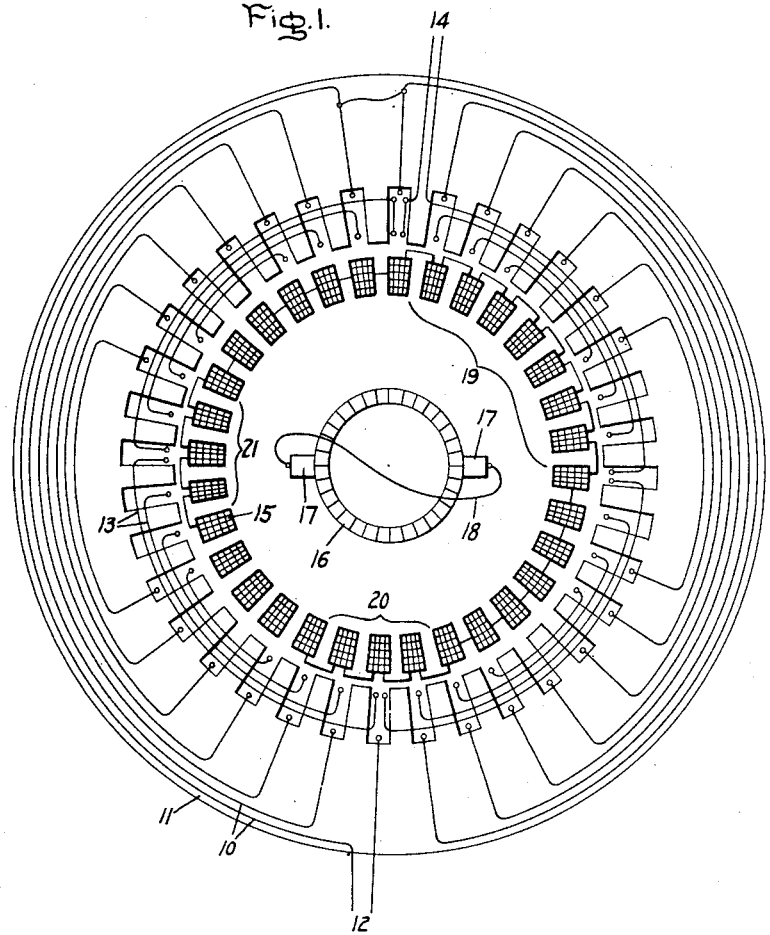

April 7, 1931.  F. W. MERRILL  1,800,028

SINGLE UNIT FREQUENCY CHANGER

Filed April 1, 1930

Inventor:
Frank W. Merrill,
by Charles E. Mullan
His Attorney.

Patented Apr. 7, 1931

1,800,028

UNITED STATES PATENT OFFICE

FRANK W. MERRILL, OF FORT WAYNE, INDIANA, ASSIGNOR TO GENERAL ELECTRIC COMPANY, A CORPORATION OF NEW YORK

SINGLE-UNIT FREQUENCY CHANGER

Application filed April 1, 1930, Serial No. 440,843, and in Great Britain April 18, 1929.

My invention relates to frequency changer apparatus, and its object is to provide a frequency changer machine consisting of a single unit having certain novel and advantageous features which will be explained hereinafter. The frequency changer machine of my invention is particularly useful for obtaining a change in frequency in the ratio of two to one.

I have heretofore filed application for this invention in the United States, said application being Serial No. 271,025, filed April 18, 1928, allowed March 8, 1929, and forfeited September 8, 1929.

Frequency changers embodying the broad principle of the invention described herein are described and claimed in my copending application, Serial No. 242,230, filed December 23, 1927, entitled "Single unit frequency changer." In general, such machines consist of a dynamo electric machine having single rotor and stator elements. The primary element, preferably the stator, is fitted with two electrically independent windings, one of which, called the fundamental or energizing winding, is adapted to be connected to the available alternating current source of power causing the secondary member, which is preferably the rotor, to rotate synchronously as a reaction motor. The rotor is preferably provided with some form of a starting winding so as to enable the machine to be self-starting and in addition is provided with polar salients which are arranged to produce a reaction motor synchronizing action and to provide a source of substantially constant unidirectional flux at synchronous speed. This flux, turning synchronously with the revolving field set up by the primary line frequency generates a higher frequency E. M. F. in the other or generating winding on the primary member as in a revolving field alternator. The generating winding is of short pitch and is wound for a greater number of poles than the fundamental winding, the ratio of the number of poles in the two windings depending upon the particular value of high frequency desired.

According to the theory explained in the application above referred to, the number of generating salients on the rotor per pair of fundamental stator poles is equal to the frequency factor minus one. For example, if it is desired to change from 60 to 120 cycles, representing a frequency factor of 2, the number of generating polar salients on the rotor should be 2−1=1 for each pair of fundamental stator poles. Such a machine would then have one rotor generating salient for a 2-pole fundamental stator winding, two rotor generating salients for a 4-pole fundamental stator winding, etc. It would thus appear that the design of a 2-pole fundamental winding machine for a frequency factor of two would be impracticable. The rotor having only one generating salient it would thus appear that it would not only be mechanically unbalanced but would not have sufficient synchronizing torque to be self-driven. The present invention relates to a further development of such frequency changers, the object being to provide such a machine as just referred to which will be mechanically balanced and will run synchronously as a reaction motor.

In carrying my invention into effect I provide the rotor with the proper number of generating salients according to the theory developed, and in addition with additional auxiliary polar salients so distributed as to substantially mechanically balance the rotor and provide a return path for the generating salient flux, but arranged so that their generating influence on the generating winding cancels at every instant whereby the resultat E. M. F. generated by such auxiliary polar salients in the generating winding is zero. It is thus possible to build practicable small sized frequency changers in accordance with the general theory outlined for changing the frequency in the ratio of two to one; however the present invention is not limited to this ratio.

The features of the invention which are believed to be novel and patentable will be pointed out in the claims appended hereto. For a clearer understanding of the invention reference is made in the following description to the accompanying drawing in which Fig. 1 represents an end view of a frequency changer embodying the present invention having a two-pole fundamental primary winding and a four-pole generating winding on the stator, and Fig. 2 represents a diagrammatic explanatory diagram of the relation of stator and rotor poles.

Referring to the drawings, 10 represents a 2-pole fundamental winding wound in the evenly distributed slots of the stator 11. The two coils of this winding are represented as connected in series and to the terminals 12 which we will assume is supplied from a 60 cycle, single phase source. In the same slots is an evenly distributed 4-pole generating winding 13 similarly connected to terminals 14 for supplying 120 cycle energy. Two poles of the generating winding cover the same space as one pole of the energizing winding. The rotor is in this case provided with a repulsion motor starting winding represented at 15 which is connected to a commutator 16 and short circuited by brushes 17 and conductor 18 along a repulsion motor axis. When the 2-pole winding 10 is energized the machine will start as a repulsion motor and come up to synchronous speed of 3600 R. P. M. The repulsion motor winding may then be completely short circuited, as described in the application previously referred to and serve as a damper winding. The rotor is provided with one main polar generating salient represented at 19, comprising in this case eight complete teeth and two auxiliary polar salients 20 and 21, comprising four complete teeth each. The intermediate teeth are cut off. The development of this arrangement is represented in Fig. 2 showing only the main polar distribution of the rotor iron and the poles of the stator.

Figure 2:
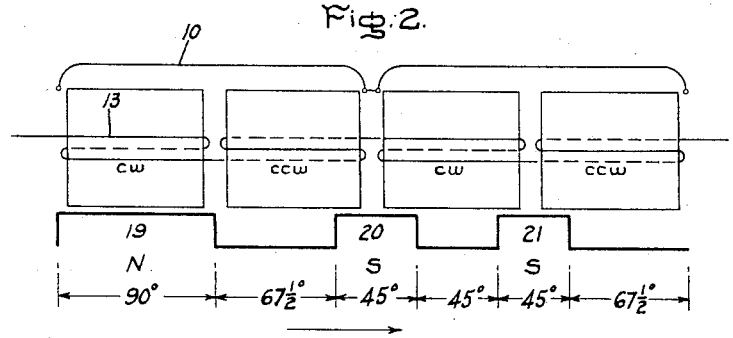

The proper spacing of the rotor salients in degrees for this arrangement is noted in Fig. 2. This spacing will depend of course upon the number of fundamental poles in the primary. As thus arranged the rotor will draw full value of flux at normal high density and will run synchronously as a reaction motor at 3600 R. P. M., salient 19 constituting one pole and the two half salients 20 and 21 together constituting the opposite pole. Furthermore, the rotor is substantially balanced mechanically. An essential feature of this arrangement is the spacing of the two half salients, 20 and 21, so that they will continuously generate opposing voltages in the 4-pole winding 13. The four coils of the winding 13 are marked cw and ccw in Fig. 2 to indicate clockwise and counter-clockwise directions of winding in order to facilitate the explanation. In the position shown when the rotor is moving in the direction represented by the arrow, half salient 20 is causing "S" flux to decrease in a ccw coil and to increase in a cw coil while half salient 21 is causing an "S" flux to increase in a ccw coil and to decrease in a cw coil. The voltages generated by these half salients in winding 13 are exactly opposite and will be so in any position of the rotor. Half salients 20 and 21 may therefore be considered as flux feeders only, having absolutely no effect on the 4-pole winding, leaving generating salient 19 free to generate 120 cycles in winding 13 with full power. Salients 20 and 21 are however very effective as motor salients on the fundamental 2-pole field produced by winding 10, causing with salient 19 strong synchronous reaction motor operation and making available an ample amount of mechanical power at 3600 R. P. M.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States is:—

1. A frequency changer comprising cooperating stator and rotor elements, one of which is provided with a multipolar energizing winding and a generating winding of a greater number of poles than the energizing winding, and the other member being provided with polar salients to provide a reaction motor secondary of the same effective pole number as said energizing winding, there being a main polar salient and a plurality of auxiliary polar salients for each pair of poles of said energizing winding, the auxiliary polar salients being spaced to have their influence on the generating winding cancel.

2. A frequency changer comprising cooperating stator and rotor members, one of which members is provided with a pair of multipolar windings of different pole numbers, one serving as an energizing winding and the other serving as a generating winding, and the other member being provided with a main polar salient and a plurality of auxiliary polar salients for each pair of poles of the energizing winding, the auxiliary polar salients serving together as one magnetic pole and the main polar salient as a magnetic pole of the opposite polarity with respect to the energizing winding to produce synchronous reaction motor action in said machine, and said auxiliary polar salients being spaced to have their influence on the generating winding cancelled whereby said main polar salient serves alone to produce synchronous generator action with respect to the generating winding.

3. A frequency changer comprising cooperating stator and rotor members, the stator member being provided with a multipolar energizing winding and a generating winding of a greater number of poles, the rotor member being provided with a starting winding and with polar salients which form a synchronous reaction motor secondary for the energizing winding, some of said polar salients being spaced with respect to the generating winding so that their generating effects cancel and the remainder of said polar salients serving alone to produce synchronous generator action with the generating winding.

4. A frequency changer comprising cooperating stator and rotor members, a multipolar energizing winding and a generating winding of a greater number of poles on said stator member, a starting winding on said rotor member, a main polar salient and a pair of auxiliary polar salients on the rotor member for each pair of poles of the energizing winding, the pair of auxiliary polar salients serving together as one magnetic pole and the main polar salient as a magnetic pole of the opposite polarity with respect to the energizing winding to produce synchronous reaction motor action in said machine, the spacing of the pair of auxiliary salients corresponding to the spacing of poles of opposite polarity in the generating winding whereby their generating influence on such winding cancels, the main polar salient serving alone to produce synchronous generator action with respect to the generating winding.

5. A frequency changer comprising a stator member provided with a multipolar energizing winding and a generating winding of a greater number of poles, a rotor member provided with a main polar salient and a plurality of auxiliary polar salients for each pair of poles of the energizing winding, the auxiliary polar salients serving together as one magnetic pole and the main polar salient as a magnetic pole of the opposite polarity with respect to said energizing winding to produce synchronous reaction motor action in said machine, said polar salients being positioned and proportioned to substantially mechanically balance said rotor members, the auxiliary polar salients also being spaced so as to produce no resultant generator action with respect to the generating winding, the main polar salient serving alone to produce synchronous generator action with respect to the generating winding.

6. A frequency changer comprising cooperating stator and rotor members, a uniformly distributed multipolar energizing winding and a uniformly distributed generating winding of twice as many poles on the stator member, the rotor member being provided with one main polar salient and a pair of auxiliary polar salients for each pair of poles of the energizing winding, the main polar salient having a span of approximately 90 degrees, the auxiliary polar salients being spaced apart and having a span of approximately 45 degrees, and the main polar salient and auxiliary polar salients being spaced apart approximately 67½ degrees, considering a span of two poles of the generating winding as 180 degrees.

7. A frequency changer comprising a stator member provided with a 2-pole energizing winding and a 4-pole generating winding, said windings being uniformly distributed with two poles of the generating winding covering the same stator portion as one pole of the energizing winding, a rotor member provided with a starting winding and with one main polar salient and two auxiliary polar salients each of approximately one-half the size of the main polar salient, the auxiliary polar salients being spaced apart a distance corresponding to the spacing of the poles of the generating winding, and the main polar salient being symmetrically placed on the opposite side of the rotor from the auxiliary polar salients.

In witness whereof, I have hereunto set my hand this 29th day of March 1930.

FRANK W. MERRILL.